2 Sheets--Sheet 1.

N. J. KELLER.

Sand and Gravel Separator.

No. 6,598. Reissued Aug. 17, 1875.

Witnesses:
R. Ellenshale
James S. Hay

Inventor:
Nicholas J. Keller
by Bakewell & Kerr
Attys.

N. PETERS, PHOTO-LITHOGRAPHER, WASHINGTON, D. C.

N. J. KELLER.

Sand and Gravel Separator.

No. 6,598. Reissued Aug. 17, 1875.

Witnesses:

R. C. Marshall
James L. Ray

Inventor:

Nicholas J. Keller
by Bakewell & Kerr
Attys.

N. PETERS, PHOTO-LITHOGRAPHER, WASHINGTON, D. C.

UNITED STATES PATENT OFFICE.

NICHOLAS J. KELLER, OF EAST BIRMINGHAM, PENNSYLVANIA.

IMPROVEMENT IN SAND AND GRAVEL SEPARATORS.

Specification forming part of Letters Patent No. 126,968, dated May 21, 1872; reissue No. 6,598, dated August 17, 1875; application filed May 31, 1875.

*To all whom it may concern:*

Be it known that I, NICHOLAS J. KELLER, of East Birmingham, in the county of Allegheny and State of Pennsylvania, have invented a new and useful Improvement in Sand and Gravel Separating Machines; and I do hereby declare the following to be a full, clear, and exact description thereof, reference being had to the accompanying drawing, forming part of this specification, in which—

Figure 1:
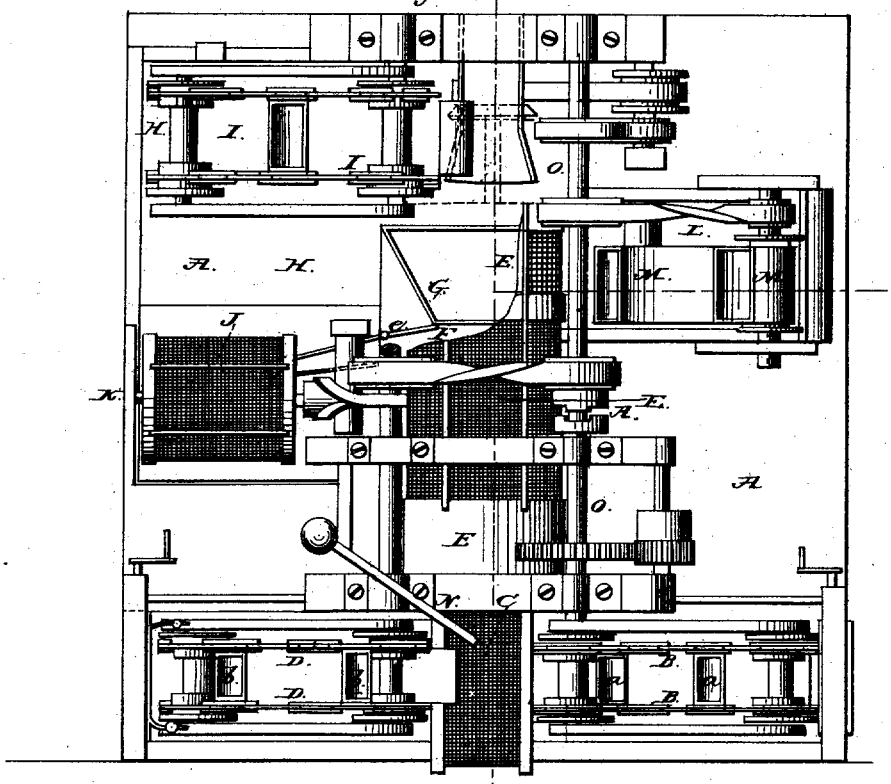
Figure 2:
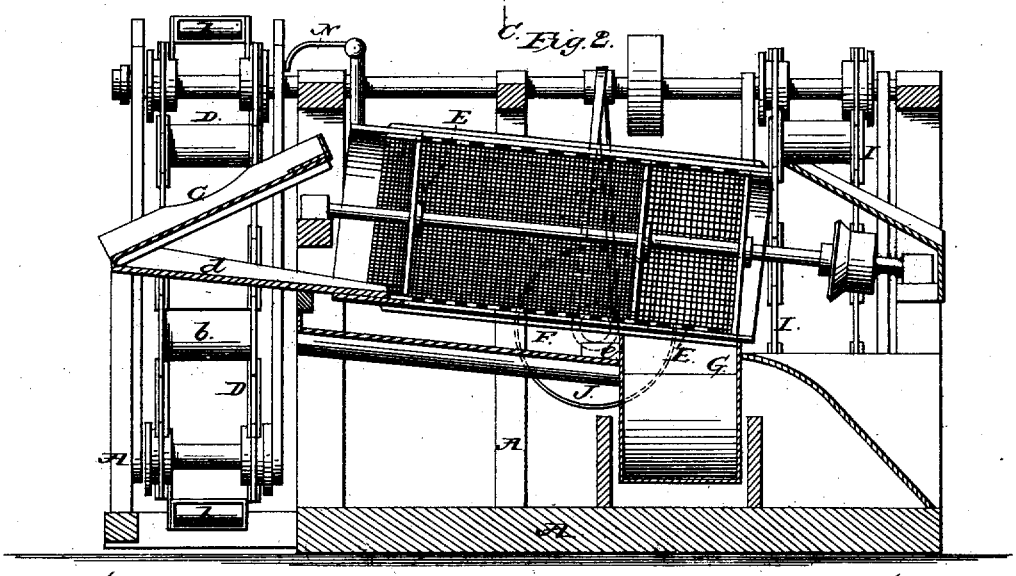
Figure 3:
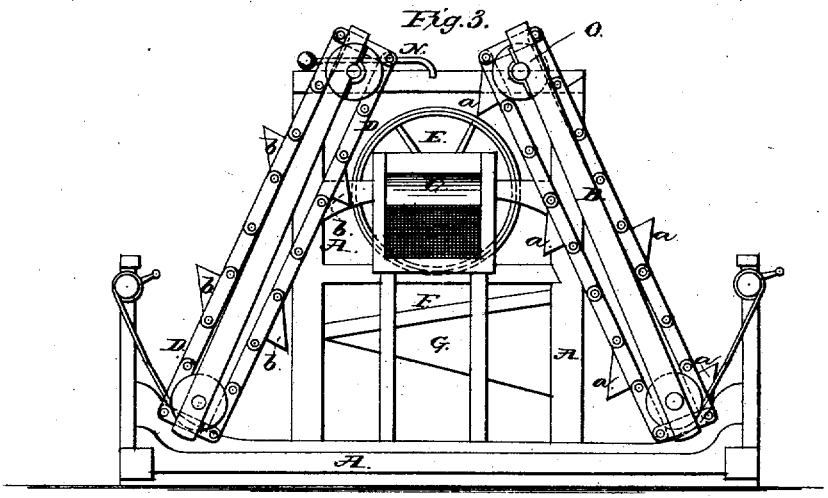
Figure 4:
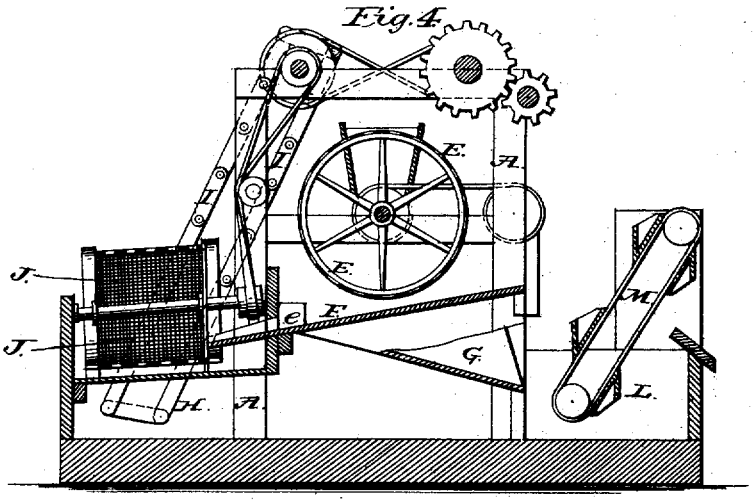

Figure 1 represents a plan or top view, partly in section, of my improved separating-machine. Fig. 2 is a vertical longitudinal section of the same on the line *c c*, Fig. 1. Fig. 3 is an end elevation, and Fig. 4 is a vertical transverse section on the line *k k*, Fig. 1.

Like letters refer to like parts wherever they occur.

This invention relates to apparatus for elevating sand, gravel, and similar materials from the beds of rivers and like places, and for separating the material so raised, whereby much valuable material is utilized; and it consists, first, in the combination of a dredging-apparatus for dredging and elevating the material, a screen for separating the material, and devices for elevating water and discharging the same into the screen to assist in the separation of the sand, &c.; second, in the combination of a screen composed of two or more sections of different-sized mesh, two or more receptacles for receiving the separated material, and suitable mechanism for supplying water to the screen; third, in the combination of a cylindrical screen, suitable devices for elevating water and the material to be separated, and feeding the same to the screen, a receptacle or receptacles for the material which has passed the screen, and an elevator or elevators for conveying away the separated material; and, finally, in details of construction, hereinafter set forth.

In the drawing, A represents the framework for the support of the separating devices, and their several connections secured to or upon a dredge-boat or other suitable boat, carrying a dredge or elevator, B, which may be an endless chain, provided with suitable buckets; and this elevator should be arranged so as to discharge into the screen or into a conduit leading thereto. D is a second endless chain or belt, provided with suitable buckets *b* for elevating water and discharging it at or about the same point as the buckets of the elevator B discharge their contents, thus preventing any tendency of the screen to clog and assist in the discharge of refuse matter. At the same side of the machine I have shown a steam siphon-pump, *n*, which may also be used for elevating the water either as an adjunct to the chain and buckets, or in place thereof, as may be found desirable.

The elevators are arranged to discharge their contents upon an inclined screen, C, located between them, said screen serving to deflect any extraneous or refuse matter, while sand, gravel, and such material as the mesh of the screen will permit to pass, fall upon a reversely-inclined table or chute, *d*, which conducts it to the upper end of an inclined perforated cylinder or screen, E.

E is a cylindrical screen generally formed of wire, and having sections of different-sized mesh, the upper being finer to permit the passage of sand, and the lower of such size as will separate the gravel, all matter not passing through the different-sized openings being discharged at the lower end of the cylinder. Beneath the finer meshes is arranged a chute, F, to receive the fine sand from the screen, said chute being provided with a gate, *e*, by operating which the sand may be either turned into a second or supplemental screen, J, of still finer mesh, when a finer sand is required, or may be directed into a receptacle, H, in which an endless belt and buckets, or similar elevator, is arranged, and by which it is transferred to a flat or other conveyance used for its removal. Beneath the coarser meshes of the screen is an additional chute, G, which receives the gravel from the screen and directs it into a second receptacle, L, whence it may be removed by a second conveyer, M.

When the gate *e* of chute F is arranged so as to direct the sand into the supplemental screen J, only the finest sand will be deposited through that screen in the receptacle H, while the coarser sand will be discharged from the end of J into a separate receptacle arranged for that purpose. The rotary parts of this separator receive motion by belts or otherwise from a main driving-shaft, O, which also imparts motion to the dredging apparatus.

The boxes H and L are filled with water for the purpose of carrying off any superfluous substances which may yet cleave to the sand or gravel after having passed through the former part of the process. The muddy water from these boxes is continually flowing off into the river, because of the agitation produced by the materials falling into the boxes and the buckets lifting it up therefrom, and the displacement caused by the sand or gravel as it settles down in the bottom of the boxes.

Having thus described my invention, what I claim, and desire to secure by Letters Patent, is—

1. The combination of a dredging apparatus for dredging and elevating the material, a screen for separating the material, and a device for elevating and discharging water into the screen, substantially as specified.

2. The combination of a screen composed of two or more sections of different-sized mesh, two or more receptacles for receiving the separated material, and a device for supplying water to the screen, substantially as specified.

3. The combination of a cylindrical screen, suitable devices for elevating water and the material to be separated, and feeding the same to the screen, a receptacle or receptacles for the material which has passed the screen, and an elevator or elevators for conveying away the screened material.

4. The combination of the screen E, chute F, provided with gate *e*, and the screen J, substantially as and for the purpose specified.

In witness whereof I, the said NICHOLAS J. KELLER, have hereunto set my hand.

NICHOLAS J. KELLER.

Witnesses:
T. B. KERR,
F. W. RITTER, Jr.